United States Patent
A et al.

(10) Patent No.: US 11,379,294 B1
(45) Date of Patent: Jul. 5, 2022

(54) SYSTEMS AND METHODS FOR CRASH ANALYSIS USING CODE VERSION HISTORY

(71) Applicant: INTUIT INC., Mountain View, CA (US)

(72) Inventors: Sudhindra A, Bangalore (IN); Sri Aurobindo Munagala, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/243,529

(22) Filed: Apr. 28, 2021

(51) Int. Cl.
*G06F 11/07* (2006.01)
*G06F 8/65* (2018.01)

(52) U.S. Cl.
CPC ........ *G06F 11/079* (2013.01); *G06F 11/0751* (2013.01); *G06F 11/0769* (2013.01); *G06F 11/0778* (2013.01); *G06F 8/65* (2013.01)

(58) Field of Classification Search
CPC ............... G06F 11/079; G06F 11/0751; G06F 11/0769; G06F 11/0778; G06F 8/65
See application file for complete search history.

(56) References Cited

U.S. PATENT DOCUMENTS

| | | | | |
|---|---|---|---|---|
| 10,042,695 | B1* | 8/2018 | Karppanen | G06F 11/0793 |
| 2016/0110238 | A1* | 4/2016 | Burugula | G06F 11/0787 |
| | | | | 714/38.11 |
| 2018/0052676 | A1* | 2/2018 | Charters | G06F 8/65 |
| 2022/0019496 | A1* | 1/2022 | Lozano | G06F 11/079 |

* cited by examiner

*Primary Examiner* — Matthew M Kim
*Assistant Examiner* — Kyle Emanuele
(74) *Attorney, Agent, or Firm* — DLA Piper LLP (US)

(57) ABSTRACT

A crash analysis system for identifying the cause of application crashes. The crash analysis system generates mapped stack traces that combine code version history data with logging information. The mapped stack traces are used to identify the causal stack frame which includes the function that caused the application crash. The crash analysis system also identifies the author of the function that caused the application crash and distributes a notification to the author that prompts the author to develop a fix that resolves the application crash.

20 Claims, 6 Drawing Sheets

FIG. 6

SYSTEMS AND METHODS FOR CRASH ANALYSIS USING CODE VERSION HISTORY

BACKGROUND

Software applications rely on complex operations to provide functionality to end users. Even simple software features require several unique functions to execute successfully in order to avoid crashes and other errors. The functions are interdependent on each other and these dependency relationships define the flow of data between the functions and the order of operations performed each time a particular feature is evoked. Software development is a highly iterative process therefore the functions included in a particular feature are independently developed. Functions are also added, removed, and or changed as features and applications develop over time. An error in any of the functions can cause a feature to malfunction and or an application to crash. Therefore, identifying the cause of application crashes is challenging because of the large number of functions required to provide application features and the frequent changes to the application code over time. Unresolved errors in software applications reduce system performance, application stability, and user satisfaction. Moreover, the amount of time and resources spent identifying the cause of crashes and other exceptions increases operating costs and reduces developer productivity. There is a need and desire to streamline identification of the cause of crashes in applications. There is also a need and desire to streamline development of patches and other fixes that resolve application crashes.

DETAILED DESCRIPTION OF SEVERAL EMBODIMENTS

The disclosed technology provides a new application crash analysis system that expedites the debugging process for software errors. The crash analysis system provides a novel mapping for stack traces (i.e., a list of all functions allocated memory during execution of a program) that is used to identify the cause of a crash. The novel mapping augments each element (i.e., stack frame) of the stack trace with code version history data including authorship and development timing data. The mapping enriches the logging information included in the stack traces with targeted pieces of code version history data that provide more context for each function that is active during execution of the program. The novel mapping provided by the crash analysis system is generated automatically whenever an exception occurs and is used to predict future crashes.

The crash analysis system analyzes the mapped stack traces to determine the cause of the application crash. The crash analysis system parses each stack frame in the stack trace and the associated code version history data to identify the stack frame including the function that caused the crash (i.e., the causal stack frame). For example, the crash analysis system can identify the causal stack frame by selecting the stack frame that includes the function having the most recent change. The crash analysis system can also identify the developer that authored the most recent change introducing and or modifying the function included in the causal stack frame based on the code version history data. To expedite the development of patches and other fixes that resolve the crash, the crash analysis system sends a notification including an assignment to investigate and resolve the error to the author of the most recent change.

Thus, the disclosed technology provides a crash analysis system that identifies the cause of errors that occur during the execution of software programs. Mapping code version history data to stack traces provides augmented logging information that is used to rapidly identify the cause of application crashes. The mapped stack traces are used to identify the causal stack frames for the crash as well as the developer best suited to resolve the error. As a result, user satisfaction is improved through improved application stability and system performance, less system downtime, lower operating costs, and faster releases of system patches and upgrades. The increased user satisfaction results in increased product engagement, positive customer ratings, and increased sales.

Figure 1:
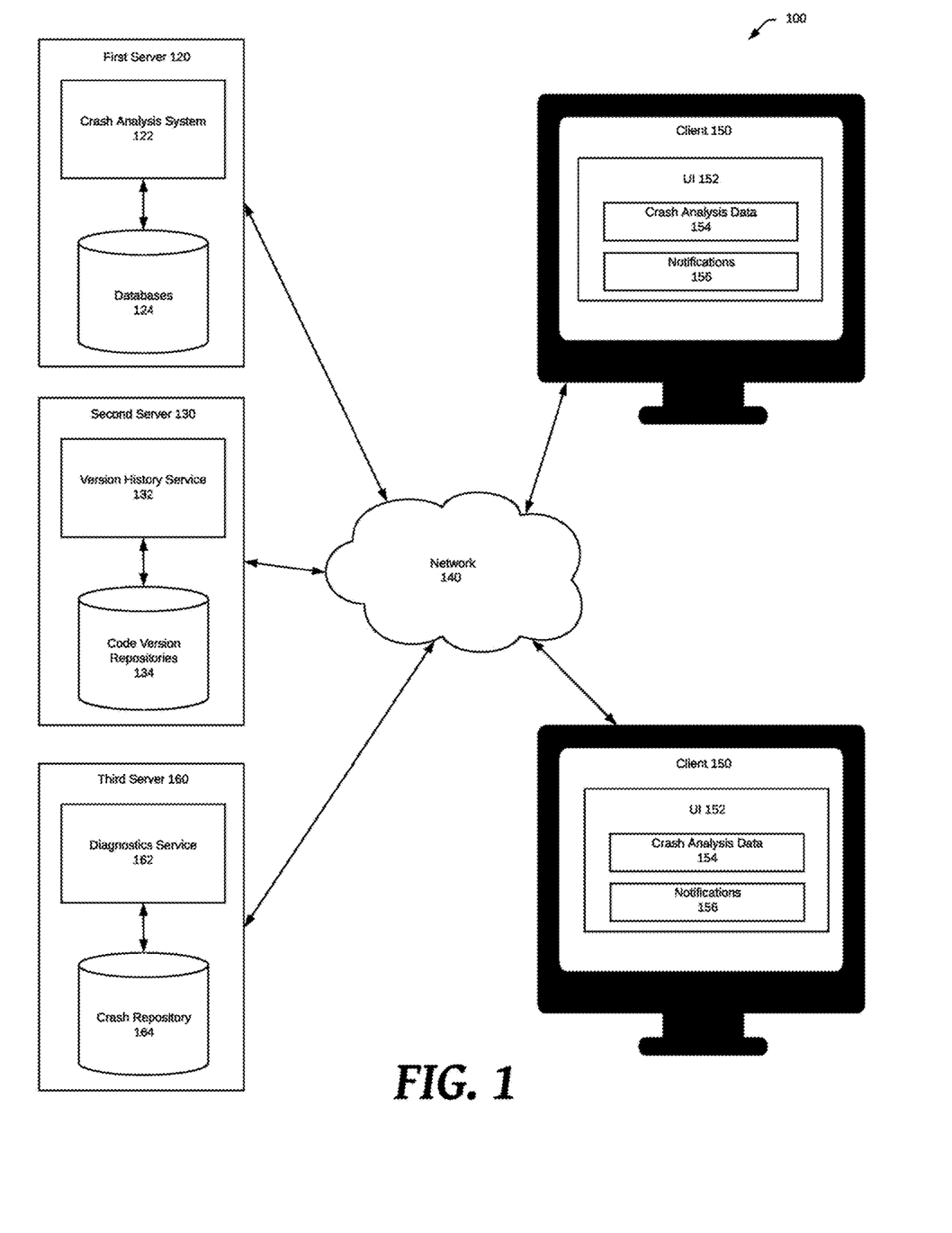
FIG. 1 illustrates an example system for identifying the cause of software application crashes according to various embodiments of the present disclosure.

FIG. 1 illustrates an example crash monitoring system 100 configured to implement a crash analysis and diagnostics system for determining the cause of a crash or other error during the execution of an application. System 100 includes a first server 120, second server 130, third server 160, and or one or more client devices 150. First server 120, second server 130, third server 160 and or client device(s) 150 are configured to communicate with one another through network 140. For example, communication between the elements can be facilitated by one or more application programming interfaces (APIs). APIs of system 100 can be proprietary and/or can be examples available to those of ordinary skill in the art such as Amazon® Web Services (AWS) APIs or the like. Network 140 refers to the Internet and/or other public or private networks or combinations thereof.

First server 120 is configured to implement a crash analysis system 122, which in one embodiment is used to monitor software applications (i.e., web applications, mobile applications, desktop applications, and the like). The crash analysis system 122 generates crash analysis data 154 that is used to analyze and resolve application crashes. Crash analysis data 154 includes logging information that documents the functions of the software applications that are executed at runtime. For example, the crash analysis system 122 generates a stack trace that lists all of the method calls an application was performing when an exception (i.e., an error, crash, and the like) occurred. Each frame (i.e., line) of the stack trace corresponds to a particular function of the application and includes a path (i.e., a location in a file directory, a file name, and a line number or other location) that can be used to locate the piece of code for the function within a file. Therefore, stack traces can be used to locate pieces of code that cause crashes and other exceptions to occur during execution of an application. The first server 120 monitors applications stored in one or more databases 124 and executed by the first server 120, second server 130, third server 160, and or client device(s) 150. Stack traces and other crash analysis data 154 generated by the crash analysis system 122 is stored in the one or more databases 124, the crash repository 164 and or in memory of the first server 120, second server 130, third server 160, and or client device(s) 150.

Second sever 130 is configured to implement a version history service 132, which in one embodiment, is used to retrieve code version history for functions and or pieces of code included in a track trace or other crash analysis data 154. The crash analysis system 122 maps code version history data received from the version history service 132 to the stack traces and other crash analysis data. The version history service 132 retrieves code version history data for each function in a stack trace from one or more code version repositories 134 included in a version control system. The version control system includes a service that manages the one or more code version repositories 134. The version control system can be a publicly available version control system (e.g., GitHub, GitLab, Bitbucket, SourceForge, and the like) or proprietary version control system. Code version history data obtained from the version control system includes a list of changes made to one or more lines of code and or files included in an application as well as other metadata related to the changes. For example, code version history data can include the author of the change, date of the change, time of the change, number of lines edited by change, number of files impacted by the change, and the like. The version history service 132 transmits stack traces via network 140 to the crash analysis system 122. The crash analysis system 122 parses the code version history data received from the version history service 132 to augment each stack frame of the stack trace with code version history data corresponding to the stack frame. The augmented stack traces generated by the crash analysis system 122 are mapped stack traces that are used to rapidly identify the cause of crashes and other exceptions thrown by applications.

Third server 160 implements a diagnostics service 162. The diagnostics service 162 expedites the development of fixes (i.e., patches) and reduce application downtime by determining the stack frame causing the error (i.e., the causal stack frame). For example, the diagnostics service 160 analyzes the mapped stack traces generated by the crash analysis system 122 using one or more rules, heuristics, algorithms, machine learning models, and or other techniques. The diagnostics service 162 also analyzes the code version history for the causal stack frame to determine the author that introduced and or most recently changed the function and or line of code referenced in the causal stack frame. The diagnostics service 162 distributes a notification 156 to the author that alerts the author of the crash. The notification can also assign the task of investigating and fixing the crash to the author that introduced the function and or has most recently changed the function.

Causal stack frames, functions and or lines of code referenced in causal stack frames, and other code version history data used to identify the cause of a crash is stored in a crash repository 164. The diagnostics service 162 uses the crash repository 164 to predict future crashes. For example, the diagnostics service 162 reviews the code of other applications monitored by the crash monitoring system 100 to determine if the applications include functions and or lines of code referenced in one or more causal stack frames included in the crash repository 164. The diagnostics service 162 determines applications that include functions and or lines of code referenced in one or more causal stack frames are likely to throw an exception when executed. The diagnostics service 162 generates a notification 156 for each piece of code (i.e., line and or function) within an application that is determined to be referenced in a causal stack frame. The diagnostics service 162 distributes the notification 156 to the author of the piece of code and or author or the most recent change to the piece of code so that the piece of code can be reviewed and fixed.

Client device(s) 150 include any device configured to receive logging information 154 and or notifications 156 generated by the crash analysis system 122 and or diagnostics service 162. Exemplary client devices 150 can include a personal computer, laptop computer, tablet, smartphone, or other device. The logging information 154 includes stack traces, mapped stack traces, and other data used to identify and resolve crashes and other exceptions. The crash analysis system 122 and or diagnostics service 162 distributes notifications 156 via network 140 to client devices 150. The notifications 156 alert users of crashes and can prompt users to investigate crashes and or develop fixes that will get the application and or a particular application functionality to execute without throwing an exception. The client devices 150 provide a user interface (UI) 152 that displays the logging information 154 and or notifications 156. The UI 152 receives input thereto to allow users to users to view and edit the logging information 154 and or notifications 156.

First server 120, second server 130, third server, databases 124, code version repositories 134, crash repository 164 and client device(s) 150 are each depicted as single devices for ease of illustration, but those of ordinary skill in the art will appreciate second server 130, third server, databases 124, code version repositories 134, crash repository 164, and client device(s) 150 can be embodied in different forms for different implementations. For example, any or each of the first server 120, second server 130, and third server 160 can include a plurality of servers or one or more of the databases 124, code version repositories 134, and crash repository 164. Alternatively, the operations performed by any or each of first server 120, second server 130, and third server 160 can be performed on fewer (e.g., one or two) servers. In another example, a plurality of client devices 150 communicate with first server 120 second server 130, and or third server 160. A single user can have multiple client devices 150, and/or there can be multiple users each having their own client device(s) 150.

Figure 2:
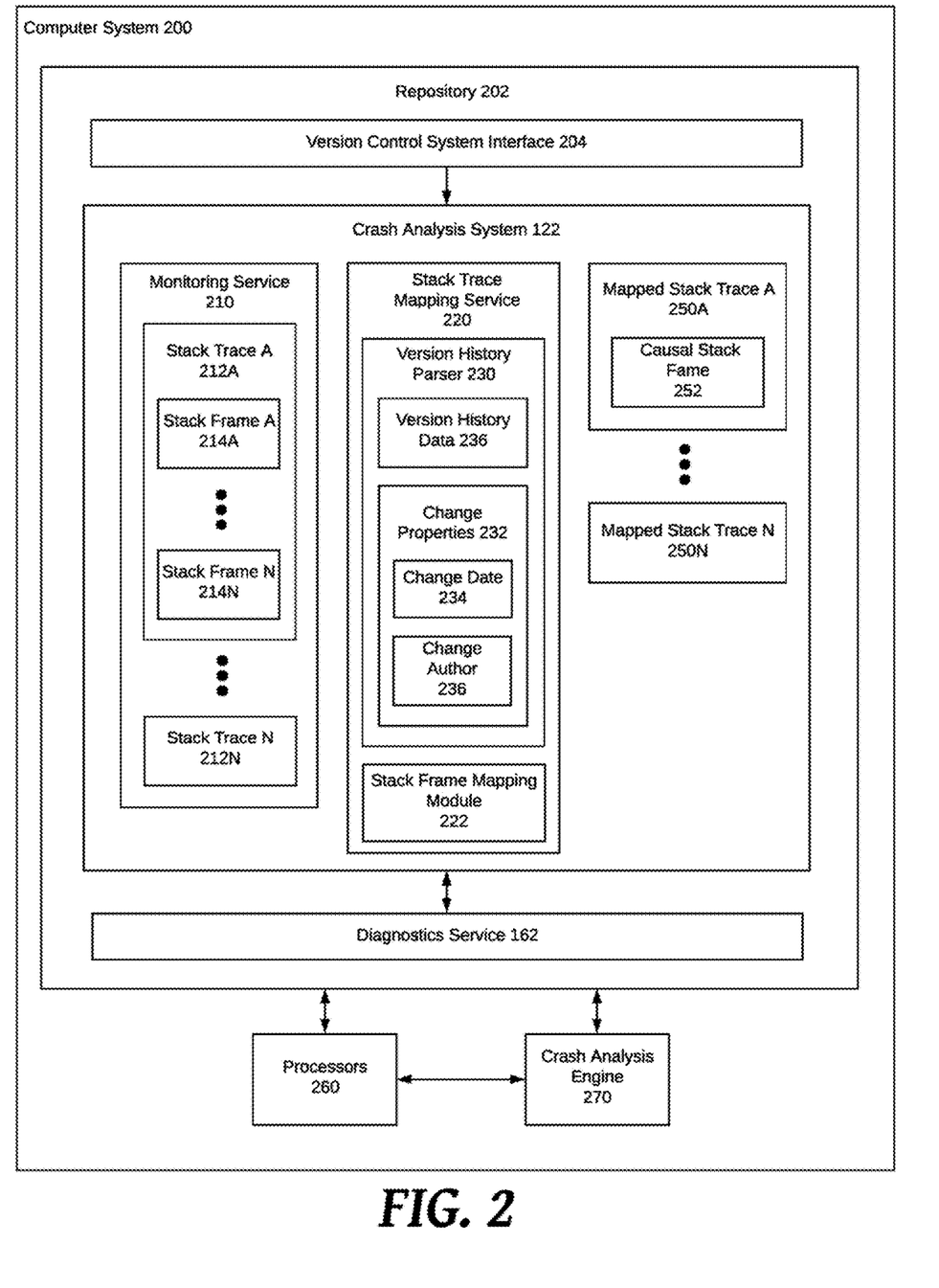
FIG. 2 shows more details of the example system shown in FIG. 1 according to various embodiments of the present disclosure.

FIG. 2 is a block diagram illustrating an example computer system 200 in accordance with one or more embodiments disclosed herein. The computer system 200 includes a repository 202, a crash analysis engine 270, and one or more computer processors 260. In one or more embodiments, the computer system 200 takes the form of the computing device 600 described in FIG. 6 and the accompanying description below or takes the form of the client device 150 described in FIG. 1. In one or more embodiments, each computer processor 260 takes the form of the computer processor 602 described with respect to FIG. 6.

In one or more embodiments, the repository 202 is any type of storage unit and/or device (e.g., a file system, database, collection of tables, or any other storage mechanism) for storing data. Further, the repository 202 can include multiple different storage units and/or devices. In one or more embodiments, the repository 202 includes a version control system interface 204, a crash analysis system 122, and a diagnostics service 162.

The crash analysis system 122 generates mapped stack traces 250A, . . . , 250N and or other data used to identify the source of a crash, error, or other exception that occurs during execution of a software application. The mapped stack traces 250A, . . . , 250N include logging information (e.g., stack traces 212A, . . . , 212N) augmented with code version history data 236 that describes changes made to the files included in the software application. The stack traces 212A, . . . , 212N include a list of functions that were called by the application when the crash occurred.

Each frame in the stack traces 212A, . . . , 212N includes a path that describes the location of the piece of code for the function in a file included in the application. The code version history data 236 describes changes made to the files listed in the stack trace. The crash analysis system 122 uses the combination of the logging information included in the stack traces 212A, . . . , 212N and the code version history data 236 to identify the causal stack frame (i.e., the function that caused the crash) 252. Developers can follow the path for the function included in the causal stack frame 252 to identify the piece of code that needs to be debugged in order to resolve the crash. The crash analysis system 122 increases the speed of the error identification process and accelerates the development of patches and other application fixes by decreasing the amount of time required to locate the developer best suited to debug the function included in the causal stack frame.

Figure 3:
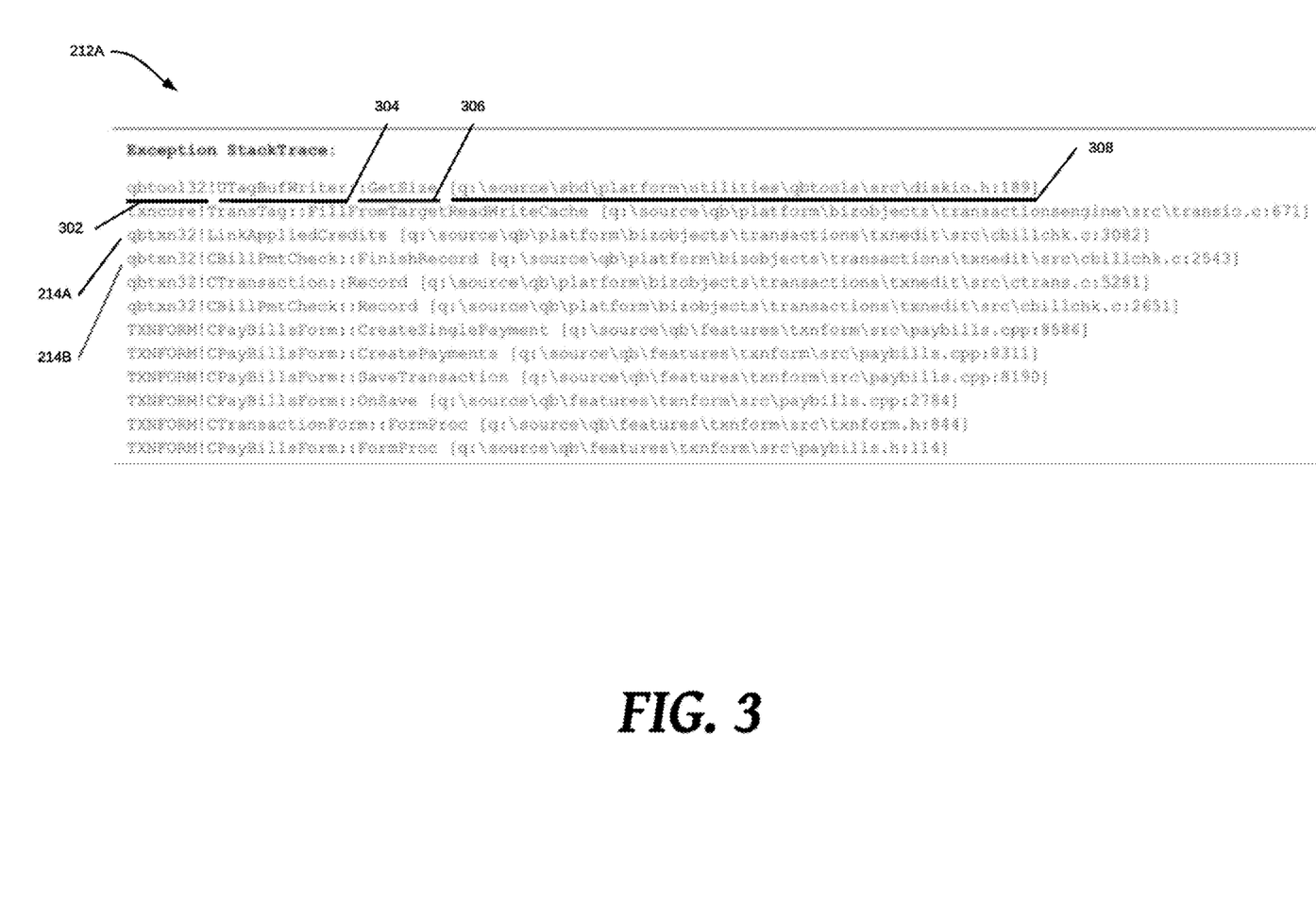
FIG. 3 shows an example stack trace according to various embodiments of the present disclosure.

FIG. 3 below illustrates an example stack trace 212A, which includes stack frames 214A, 214B, . . . , 214N with each line of the stack trace 212A corresponding to a unique stack frame (e.g., 214A). The stack frames 214A, . . . , 214N are arranged in a hierarchical order and are triggered from bottom to top so that each function in the stack trace 212A is evoked by the function above it. For example, the function in the second line of stack trace 212A calls the function in the first line of the stack trace 212A. Accordingly, each stack frame 214A, . . . , 214N in the stack trace 212A builds on itself so that the functions below the top line of stack trace 212A ultimately lead to the call of the function in the first line of the stack trace 212A. When one function call returns its data to its caller and or successfully executes the called piece of code that the stack frame (e.g., 214A) is removed from the stack. New stack frames 214A, . . . , 214N are added and removed until the bottom most stack frame gets all of the data it needs and or all of the called pieces of code are executed.

Each stack frame 214A, . . . , 214N includes data that describes a function that was called by the application when the crash occurred. For example, the stack frames 214A, . . . , 214N include the module name 302, the class name 304, and the function name 306. The module name 302 identifies the module (i.e., package and or file) that defines the attributes of the class of the function recited in the class name 304. The class name 304 identifies the attributes of the function (i.e., the function name 306) included in a particular stack frame. A path 308 can also be added to the stack frames 214A, . . . , 214N to facilitate the debugging process. For example, the path 308 can be obtained from symbol files created by the operating system. The path 308 includes a location (i.e., a particular file location in file directory) of the file including the function. The path 308 also includes a line number that describes the location within the file for the piece of code including the function. Accordingly, the path 308 can be used to efficiently locate the piece of code that needs to be debugged to resolve the error that caused the application to throw an exception (i.e., crash). The path 308 is added to each stack frame 214A, . . . , 214N in the stack trace 212A by a component of the crash analysis system 122 (e.g., a monitoring service 210 and or a stack trace mapping service 220).

Referring back to FIG. 2, the crash analysis system 122 includes a monitoring service 210 that generates the stack traces 212A, . . . , 212N. The monitoring service 210 tracks the activity of applications (e.g., web applications) running on a plurality of servers or other devices to generate the stack traces 212A, . . . , 212N. For example, the monitoring service 210 can be included in an error logging system that monitors the activity of hundreds of application instances executed on a plurality of virtual machines. The monitoring service 210 includes an API or other interface that receives the stack traces 212A, . . . , 212N and other logging data from the error logging system. The monitoring service 210 receives logging data continuously from the error logging system and or automatically receives stack traces 212A, . . . , 212N in response to crashes and other exceptions thrown during the execution of the applications monitored by the monitoring service 210. The stack traces 212A, . . . , 212N generated by the monitoring service 210 are provided to the crash analysis system 122 in a machine readable format (e.g., JSON, XML, and the like).

To combine logging data with code version history data 236, stack traces 212A, . . . , 212N generated by the monitoring service 210 are transferred to the stack trace mapping service 220. The stack trace mapping service 220 receives code version history data 236 from the version control system interface 204. The version control system interface 204 is an API or other interface that communicates with a version control system that manages code repositories. The version control system can be a publicly available version control system (e.g., GitHub, GitLab, Bitbucket, SourceForge, and the like) or proprietary version control system. The version control system interface 204 communicates with the version control system to retrieve code version history data 236 for the files included in the application (i.e., the files containing the functions included in the stack traces 212A, . . . , 212N). Code version history data 236 includes a record of changes made to one or more files included in an application as well as other metadata related to the changes. For example, code version history data 236 can include the author of the change, the date of the change (i.e., a date), the time of the change (i.e., a timestamp), the number of lines edited by change, the number of files impacted by the change, and the like. The code version history data 236 is provided by the version control system in a machine-readable format (e.g., JSON, XML, and the like) that can be manipulated and transferred to the crash analysis system 122 by the version control system interface 204.

A code version history parser 230 included in the stack trace mapping service 220 parses the code version history data 236 received from the version control system interface 204. The code version history parser 230 parses the code version history data 236 to identify the changes to the files having functions included in the stack frames of the stack traces 212A, . . . , 212N. The code version history parser 230 extracts a set of change properties 232 for each change introducing and or modifying a function included in a particular stack frame. For example, the code version history parser 230 iterates through raw code version history data 236 including all of the changes submitted for all of the files included in the application to identify the changes to the files that introduce and or modifying a function named in the particular stack frame. The code version history parser 230 can extract all the changes introducing and or modifying the functions named in the stack trace. The code version history parser 230 can also limit the extracted changes to just the most recent change and or changes (i.e., most recent 2, 3, or any other number of changes) for each function named in the stack trace.

The code version history parser 230 reviews the code version history data 236 for each change and extracts a set of properties for each change (i.e., change properties 232) that are relevant to performing crash analysis (e.g., identifying the cause of the crash, identifying crash fixes, and the like). The change properties 232 include metadata describing each change. The metadata included in the change properties 232 are used to determine the causal stack frame 252 (i.e., the stack frame that caused the crash) and or provide context about the change that can streamline development of a patch that resolves the crash. For example, the change properties 232 include the change date 234 (i.e., the date and or time the change to the file that introduces and or modifies the function was committed to the code repository) and the change author (i.e., a user id or other identifier for the user that created and submitted the change). The code version history parser 230 also analyzes raw code version history data 236 to determine one or more change properties 232 that are used to identify the causal stack frame 252. For example, the code version history parser 230 determines the amount of time elapsed since the most recent change to file that includes a function of the stack frame 214A was submitted. The code version history parser 230 determines the elapsed time since the most recent change by calculating the time difference between dates and or timestamps recorded for the changes in the code version history data 236. The code version history parser 230 labels the change properties 232 for each change with the function name, file name, stack trace line number, or other identifier that associates the change properties 232 with the particular stack frame including the function that corresponds to the change.

The change properties 232 and or labels associating the change properties 232 with their corresponding stack frame 214A generated by the code version history parser 230 are transferred to stack frame mapping module 222. The stack frame mapping module 222 generates mapped stack traces 250A, . . . , 250N using the stack traces 212A, . . . , 212N received from the monitoring service 210 and the change properties 232 generated by the code version history parser 230. The stack frame mapping module 222 matches the change properties 232 with the stack frame 214A that includes the function and or file modified by the change described in the change properties 232. For example, the stack frame mapping module 222 maps a stack frame 214A including function "X" with change properties 232 for the change to the application's code repository that created and or modified function "X". An example of the stack frames 214A, . . . , 214N augmented with change properties is shown in the mapped stack trace 250A shown in FIG. 4.

Figure 4:
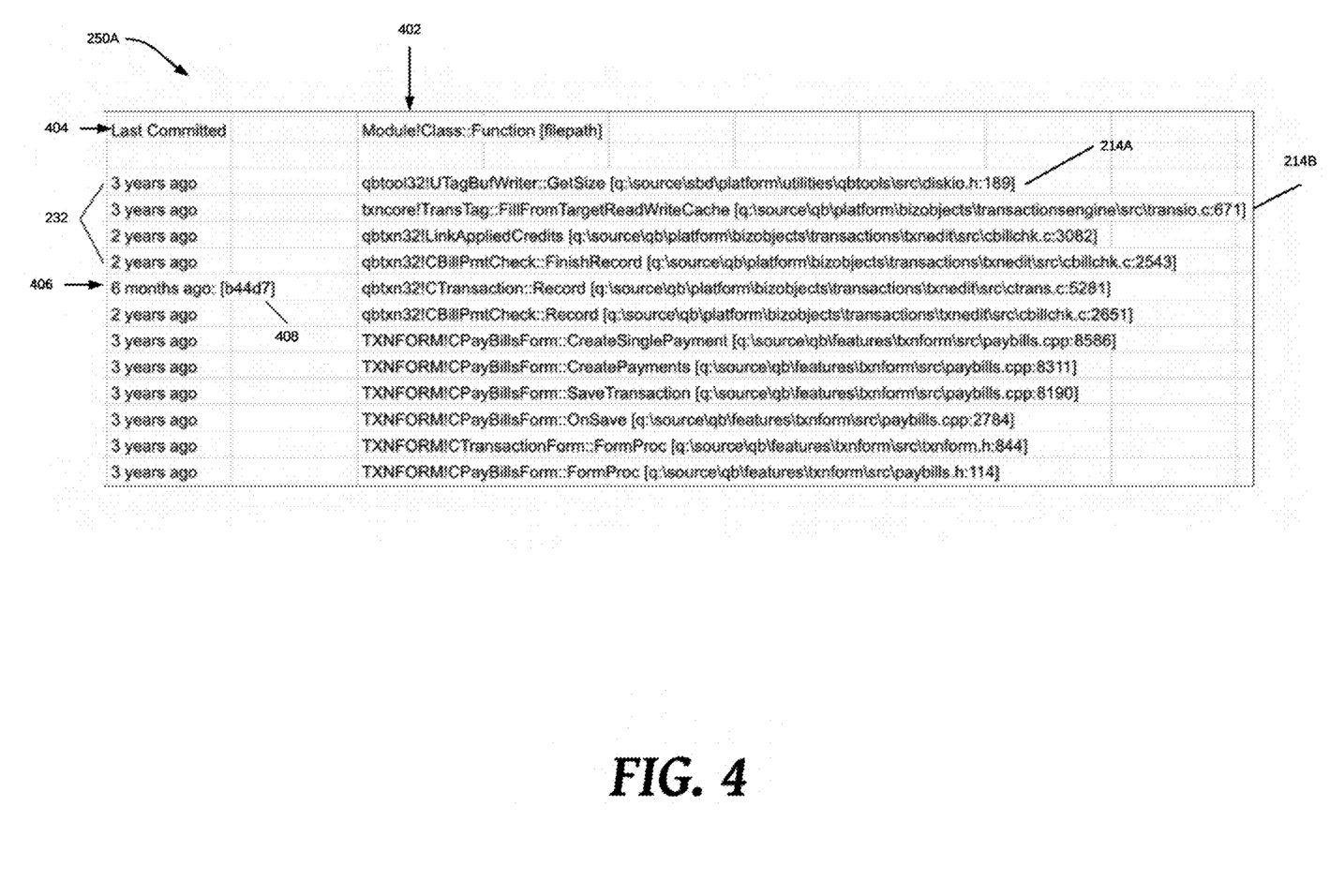
FIG. 4 shows an example mapped stack trace according to various embodiments of the present disclosure.

FIG. 4 illustrates an example mapped stack trace 250A including stack traces 214A, 214B, . . . , 214N augmented with change properties 232. The mapped stack trace 250A includes a list of stack frames 214A, 214B, . . . , 214N in the right side column 402 of the table with each line in the mapped stack trace 250A including unique stack frame that corresponds to a particular function. Each stack frame 214A, . . . , 214N includes a set of change properties 232 shown in the left side column 404 of the table. The change properties 232 include one or more pieces of data extracted from the code version history data. For example, the change properties 232 of the stack trace 250A list the amount of time since the last change was committed to the file introducing and or modifying the function named in each of the stack frames 214A, . . . , 214N. The change properties 232 shown in the left side column 404 correspond to the stack frames 214A, . . . , 214N in the right side column 402 so that the change properties 232 that refer to a particular stack frame are listed on the same line as the particular stack frame. For example, the change properties 232 shown in the first line of left side column 404 refer to the stack frame 214A in the first line of the right side column 402.

The change properties 232 listed for the stack frames 214A, . . . , 214N can change depending on the code version history data used to identify the causal stack frame. In the example mapped stack frame 250A, the causal stack frame is identified based on the most recent change dates. Therefore, the amount of time since the most recent change to the files introducing and or modifying the functions in the stack trace is shown for each stack frame. The most recent change dates used to determine the causal stack frame can be the submission date of a particular function, particular line within a function, or other piece of code included in the stack frame. The causal stack frame is shown in line five 406 of the table and has the shortest amount of elapsed time since the most recent change (i.e., 6 months since the line within the function pointed by the path of the stack frame on line five 406 was changed). Line 5281 of the Record( ) function is pointed by (i.e., referenced in the path) of the causal stack frame, therefore, is the piece of code that caused the exception.

The change properties 232 for the causal stack frame include the change ID 408 and other metadata that describes the change to the function and or file name listed in the causal stack frame. The change ID 408 is used to retrieve other pieces of code version history data that facilitates developing a patch that resolves the crash caused by the causal stack frame. For example, the change ID 408 is used to retrieve the author of the change, other files impacted by the change, contact information for the author of the change, other changes submitted by the author of the change, other changes submitted around the same time as the change corresponding to the causal stack frame, and the like.

Referring back to FIG. 2, mapped stack traces 250A, . . . , 250N generated by the stack frame mapping module 222 include an identifier for the causal stack frame 252. The identifier for the causal stack frame 252 identifies the stack frame including the function that caused the crash or other exception (i.e., the causal stack frame). As discussed above, the causal stack frame 252 is identified based on change properties 232 for the stack frames 214A, . . . , 214N included in the stack traces 212A, . . . , 212N. For example, the causal stack frame 252 can be identified based on the date of a change introducing and or modifying the function pointed by the stack frame. To expedite resolving the crash caused by the causal stack frame 252, the mapped stack traces 250A, . . . , 250N are transferred to the diagnostics service 162 for further analysis.

The diagnostics service 162 analyzes the mapped stack traces 250A, . . . , 250N to determine the causal stack frame 252 based on the change properties for the stack frames 214A, . . . , 214N included in each mapped stack trace. The diagnostics service 162 can identify multiple causal stack frames based on the change properties 232. For example, if two or more stack frames 214A, . . . , 214N have the same and or similar change properties 232 (i.e., two stack frames share the most recent change date), the diagnostics service 162 will consider the entire set of stack frames 214A, . . . , 214N as the causal stack frames. The diagnostics service 162 can also identify the author of the function pointed by the causal stack frame(s) 252 based on the change properties 232.

To ensure the developer having the most familiarity with the function in the casual stack frame(s) 252 can work on resolving the crash, the diagnostics service 162 generates a notification that alerts the author of the crash and provides the function that caused the crash. The notification can include an assignment that assigns an investigation and or debugging task to the author of the function so that the author can begin working on developing a fix that resolves the crash right away. The notification can include the causal stack frame(s) 252 so that the author can use the path to quickly locate the file and piece of code including the function that caused the crash. If the diagnostics service 162 identifies multiple causal stack frames 252 having different authors each author of at least one causal stack frame 252 receives a notification. The diagnostics service 162 distributes the notification(s) to the author(s) using contact information for the author(s) included in the change properties 232. The diagnostics service 162 can extract the author(s) contact information using a change ID for the change including the function of the causal stack frame and or a user ID for the author included in the code version history data 236. For example, the diagnostics service 162 can extract an email address for the author from the metadata included in the change associated with the change ID (i.e., the change author's username, user ID, and or profile).

The causal stack frames 252 identified by the diagnostics service 162 are stored in a crash repository. The diagnostics service 162 uses the previously identified causal stack frames 252 included in the crash repository to predict future crashes. For example, the diagnostics service 162 analyzes the causal stack frames to predict future crashes and check for vulnerabilities in files and other pieces of code included in a code version repository managed by the version control system. To predict future crashes and identify vulnerabilities, the diagnostics service 162 compares the pieces of code in the code version repository to the functions pointed by the causal stack frames included in the crash repository. The diagnostics service 162 determines a piece of code is likely to cause a crash and or have a vulnerability based on detecting a function pointed by a causal stack frame in the piece of code. For example, the diagnostics service 162 can determine a piece of code including the Record( ) function and or the same code as in line 5281 (i.e., the function and or line pointed by the causal stack frame in FIG. 4) includes a vulnerability and should be reviewed for errors to prevent crashes.

To facilitate the review of pieces of code determined to include vulnerabilities, the diagnostics service 162 extracts the author of the most recent change to the function or line determined to include a vulnerability from code version history data. The diagnostics service 162 generates a notification alerting the author of vulnerability. The notification can also include a task for investigating the piece of code, patching the vulnerability, and like. The diagnostics service 162 distributes notifications to authors based on contact information (i.e., user name, email address, account id, and the like) extracted from code version history data.

The crash analysis system 122 augments stack traces 212A, . . . , 212N and other logging information with code version history data 236 to improve the accuracy of causal stack frame identification. The code version history data 236 provides context about the development process of each function included in the stack traces 212A, . . . , 212N that has not been previously considered in the diagnostic process for application exceptions. The context provided by the change properties 232 combined with the hierarchical order of the stack traces 212A, . . . , 212N enables the function, file, and piece of code within the file that caused the exception to be quickly identified. Identifying the causal stack frame 252 and assigning the task of resolving the exception to the author of the change ID associated with the causal stack frame 252 also reduces the amount of time required to diagnose and fix crashes and other exceptions. Notifications generated by the diagnostics service 162 are automatically sent to the author(s) of the changes including the functions of the causal stack frames 252 to ensure the developer having the most knowledge of each function is assigned the task of working on resolving the exception. The author of the change is more familiar with the function than other developers who have not worked on the particular function and or file. Therefore, the author of the change can debug the function faster than other developers. Increasing the speed of developing patches and other fixes for bugs reduces the amount of time and resources spent on restoring the application, reduces the amount of system downtime, and improves user experience.

Figure 5:
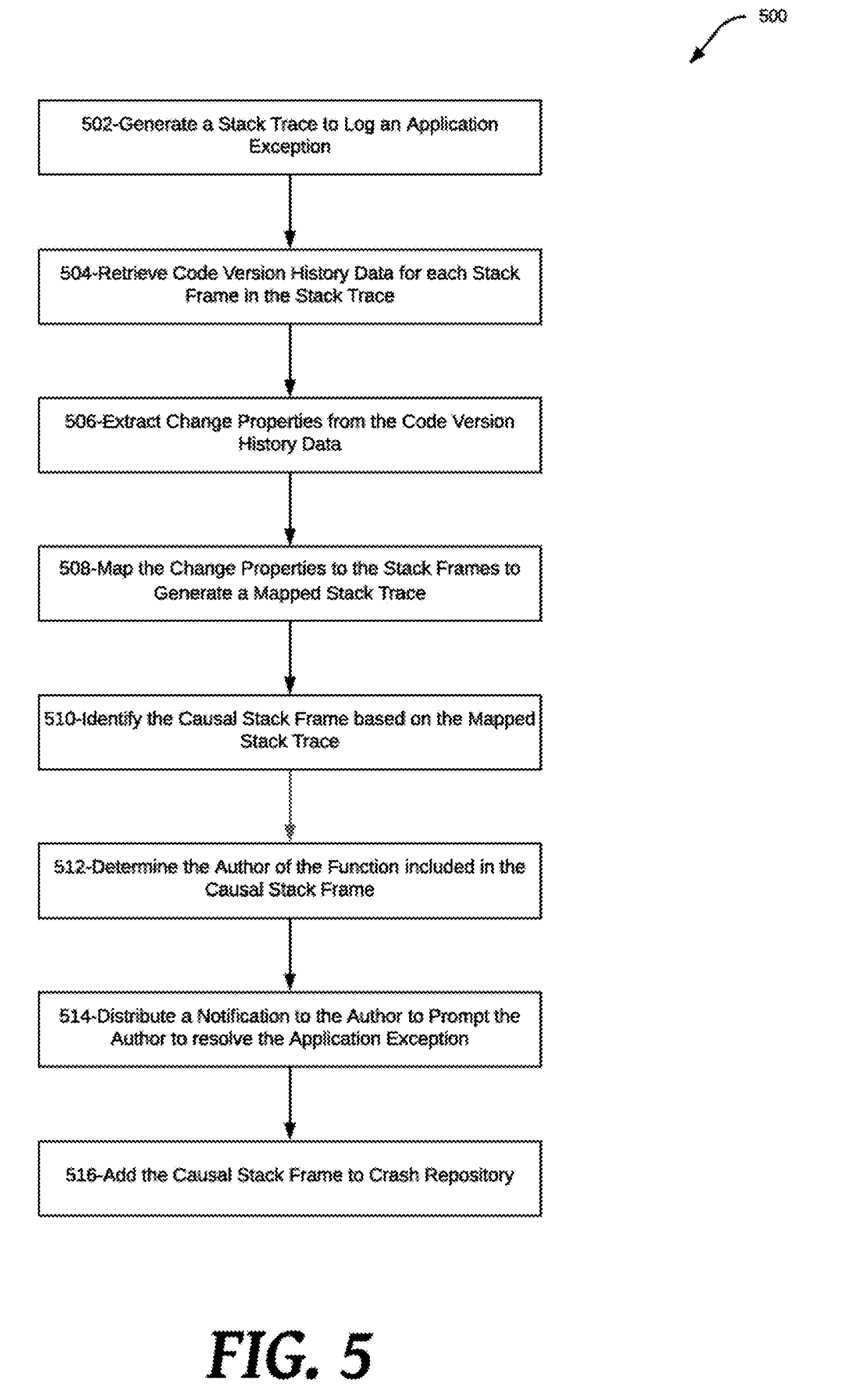
FIG. 5 is a flow diagram illustrating an example process of identifying the cause of software application crashes according to various embodiments of the present disclosure.

FIG. 5 illustrates an example process 500 for identifying the cause of an application crash or other exception. At step 502 the monitoring service generates a stack trace in response to a crash, error, or other exception thrown by an application. The exception can be generated on command by the crash analysis system in order to test a particular application under certain conditions. The exception can also be generated natively by an application in production. The stack trace includes multiple stack frames that describe the functions called by the application at the time the exception was thrown. The list of stack frames included in the stack trace form a log of the functions that were in progress when the exception was thrown. Therefore, one or more of the stack frames in the stack trace includes the function that caused the exception.

At step 504, the stack trace mapping service obtains code version history data for the functions and or files included in the stack frames from a version control system. The stack trace mapping service communicates with the version control system to request code version history data via a version control system interface (e.g., an API). The version control system interface provides a function and or protocol for retrieving the code version history data. The code version history data is provided by the version control system interface in a machine readable formal (e.g., JSON, XML, and the like). At step 506, the code version history parser analyzes the code version history data to extract change properties for the functions and or files included in the stack frames of the stack trace. For example, the code version history parser can extract a change ID for each change creating and or modifying a function included in a stack frame. The code version history parser uses the change ID to extract other change properties from the code version history data. For example, the code version history parser can extract the date the change was submitted to a code repository, the author of the change, the number of lines of code included in and or modified by the change, and the like. The code version history parser also calculates change properties from raw code version history data. For example, the code version history parser can determine the date of the most recent change to a function and or file (i.e., the change date) for the stack frames included in the stack trace from dates and or timestamps included in code version history data.

At step 508, the stack frame mapping module maps the change properties to the stack frames included in the stack trace to generate a mapped stack trace. The mapped stack trace augments the stack frames with code version history data to provide context for each function included in the stack frames. At step 510, the diagnostic service identifies the causal stack frame (i.e., the stack frame including the function that caused the application to throw the exception) using the mapped stack trace. For example, the diagnostic service can identify the causal stack frame based on the stack frame having the function and or file with the most recent change date (i.e., the function or file that was most recently submitted to the code repository). To identify the causal stack frame based on the change date, the diagnostic service iterates through each stack frame in the stack trace and compare the change date for each stack frame to identify the stack frame with the most recent change date. If multiple stack frames have the same and or similar change date, the diagnostic service can identify multiple causal stack frames.

At step 512, the diagnostic service determines the change ID for the causal stack frame from the change properties. The diagnostic service uses the change ID to determine the author of the function included in the causal stack frame. For example, the diagnostics service can look up the change author in the change properties and or code version history data using the change ID. At step 514, the diagnostics service distributes a notification to the change author to prompt the author to develop a patch that resolves the application exception (i.e., the crash). The notification generated by the diagnostics service can include the causal stack frame and or an assignment that assigns an investigation and or debugging task to the change author.

At step 516, the diagnostics service adds the causal stack frame to a crash repository or other database. The diagnostics service uses the crash repository to identify instances of the causal stack frame in other files and or applications. For example, the diagnostics service reviews multiple files included in an application and or managed by a version control system to determine if any other files have the function included in the causal stack frame. To facilitate faster development of patches and ensure the same function does not cause exceptions in other applications, the diagnostics service generates a notification that lists the other files and or applications that have the function included in the causal stack frame. The notification is sent to the author of the change that introduced the function of the causal stack frame to alert the author of the other instances of the function and or assign a task for modifying the other instances of the function to the author. The diagnostics service can also automatically push changes to the function that resolve the crash to the other instances of the function in order to avoid having to fix the other files and or applications that include the function manually. Accordingly, the diagnostics service can anticipate and resolve crashes before they occur.

Figure 6:
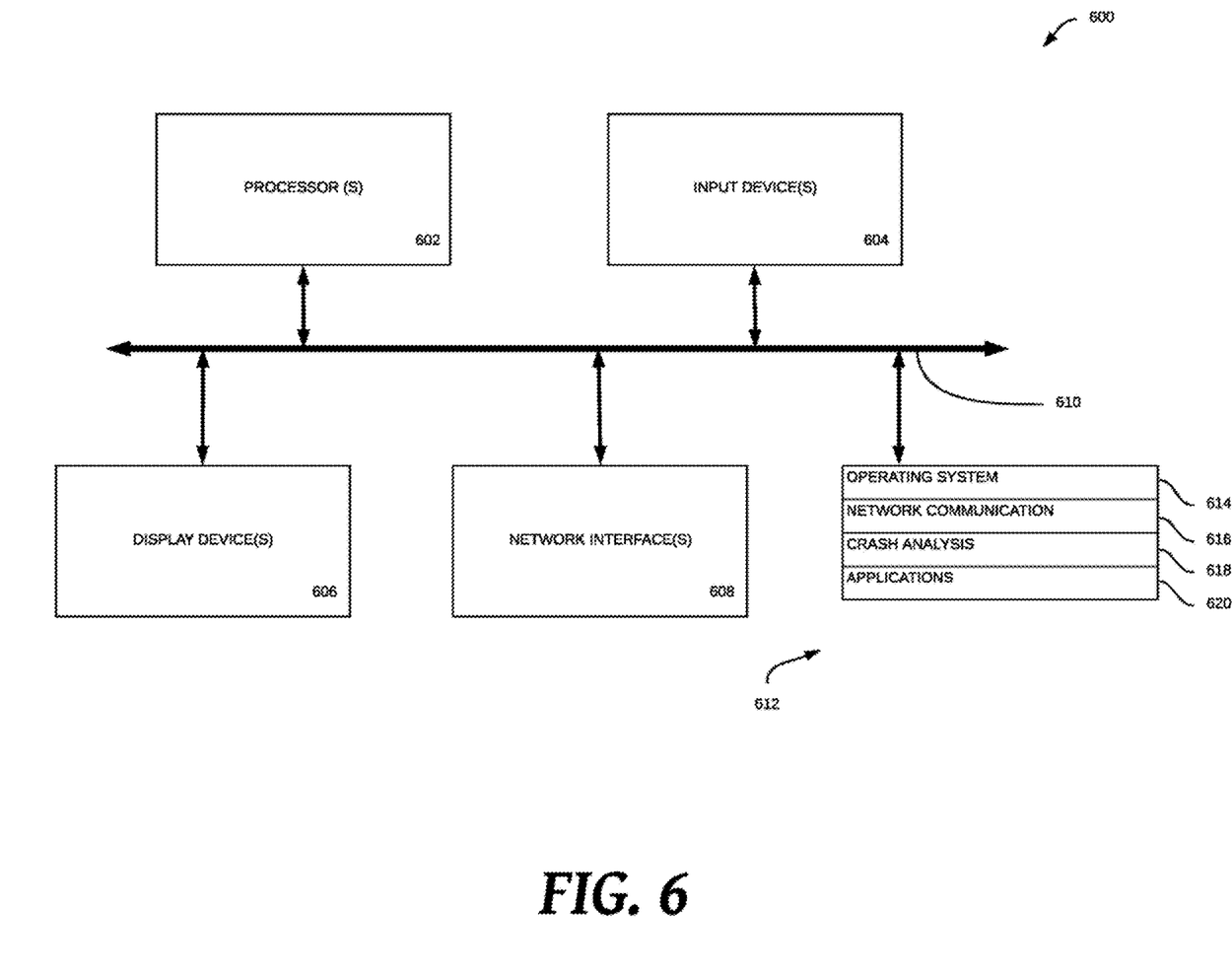
FIG. 6 is a block diagram illustrating an example computing device according to an embodiment of the present disclosure.

FIG. 6 shows an example computing device according to an embodiment of the present disclosure. For example, computing device 600 may function as client device 150, first server 120, and or second server 130. The computing device 600 may include a crash analysis system that identifies the cause of application crashes as described above or a portion or combination thereof in some embodiments. The computing device 600 may be implemented on any electronic device that runs software applications derived from compiled instructions, including without limitation personal computers, servers, smart phones, media players, electronic tablets, game consoles, email devices, etc. In some implementations, the computing device 600 may include one or more processors 602, one or more input devices 604, one or more display devices 606, one or more network interfaces 608, and one or more computer-readable mediums 612. Each of these components may be coupled by bus 610, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, camera, and touch-sensitive pad or display. Bus 610 may be any known internal or external bus technology, including but not limited to ISA, EISA, PCI, PCI Express, USB, Serial ATA or FireWire. Computer-readable medium 612 may be any non-transitory medium that participates in providing instructions to processor(s) 604 for execution, including without limitation, non-volatile storage media (e.g., optical disks, magnetic disks, flash drives, etc.), or volatile media (e.g., SDRAM, ROM, etc.).

Computer-readable medium 612 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 612; controlling peripheral devices (e.g., disk drives, printers, etc.) which can be controlled directly or through an I/O controller; and managing traffic on bus 610. Network communications instructions 616 may establish and maintain network connections (e.g., software for implementing communication protocols, such as TCP/IP, HTTP, Ethernet, telephony, etc.).

Crash analysis instructions may include instructions that enable computing device 600 to function as a crash analysis system and/or to provide mapped stack traces and or notifications as described herein. Application(s) 620 may be an application that uses or implements the processes described herein and/or other processes. The processes may also be implemented in operating system 614. For example, application 620 and/or operating system may create tasks in applications as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method of identifying a cause of an application crash, the method comprising:
receiving a stack trace including multiple stack frames, each stack frame including a function that was called by an application during the application crash;
retrieving code version history data for each stack frame, the code version history data including a change to the function included in each stack frame;
extracting multiple change properties for each change in the code version history data;
mapping the change properties to the stack frames by associating each change included in the code version history data with the function included in the stack frames; and
identifying a causal stack frame based on the change properties for each stack frame, the causal stack frame including the function that caused the application crash;
receiving a patch that resolves the application crash; and
automatically pushing the patch that resolves the application crash to the function that caused the application crash.

2. The method of claim 1, further comprising:
identifying an author of the function included in the causal stack frame based on the change properties; and
distributing a notification to the author, the notification assigning to the author a task of developing a patch that resolves the application crash.

3. The method of claim 1, wherein the change properties include a change date that relates to an amount of time that has passed since a particular change was submitted.

4. The method of claim 3, further comprising:
extracting at least one of a date or timestamp for each change from the code version history data;
calculating the change date for each change based on the extracted date or timestamp;
comparing the change date for each change to determine a most recent change date; and
identifying the causal stack frame by selecting a stack frame having the most recent change date.

5. The method of claim 1, further comprising:
determining multiple causal stack frames based on the change properties;

identifying an author for each function included in the multiple causal stack frames based on the change properties for each stack frame included in the multiple causal stack frames; and distributing a notification to the author of each function, the notification assigning to the author of each function a task of developing a patch that resolves the application crash.

6. The method of claim 1, further comprising:
adding the causal stack frame to a crash repository; and
reviewing multiple files included in the application to determine if any other files include the function included in the causal stack frame.

7. The method of claim 1, further comprising:
storing the causal stack frame in a crash repository including multiple causal stack frames;
identifying a vulnerability in a piece of code by comparing the piece of code to the multiple causal stack frames included in the crash repository; and
determining that the piece of code includes a vulnerability based on detecting a function included in at least one of the multiple causal stack frames in the piece of code.

8. The method of claim 1, further comprising adding a path including a file name and a line number to each stack frame included in the stack trace.

9. The method of claim 1, wherein the stack frames included in the stack trace are arranged in hierarchical order so that each function below a first line of the stack trace ultimately leads to a call of a function in the first line of the stack trace.

10. The method of claim 1, wherein the code version history data is retrieved from a version control system that manages multiple code repositories including a code repository that stores each file included in the application.

11. A system for identifying a cause of an application crash, the system comprising:
a repository configured to store a stack trace including multiple stack frames, each stack frame including a function that was called by an application during the application crash;
a stack trace mapping service executing on a processor and being configured to:
receive the stack trace;
retrieve code version history data for the multiple stack frames, the code version history data including a change to the function included each stack frame;
extract multiple change properties for each change in the code version history data;
map the change properties to the stack frames by associating each change included in the code version history data to the function included in the stack frames; and
a diagnostics service executing on the processor and being configured to:
identify a causal stack frame based on the change properties for each stack frame, the causal stack frame including the function that caused the application crash;
receive a patch that resolves the application crash; and
automatically pushing the patch that resolves the application crash to the function that caused the application crash.

12. The system of claim 11, wherein the diagnostics service is further configured to:

identify an author of the function included in the causal stack frame based on the change properties; and
distribute a notification to the author, the notification assigning to the author a task of developing a patch that resolves the application crash.

13. The system of claim 11, wherein the change properties include a change date that relates to an amount of time that has passed since a particular change was submitted.

14. The system of claim 13, wherein the stack trace mapping service is further configured to:
extract at least one of a date or timestamp for each change from the code version history data;
calculate the change date for each change based on the extracted date or timestamp;
compare the change date for each change to determine a most recent change date; and
the diagnostics service is further configured to identify the causal stack frame by selecting a stack frame having the most recent change date.

15. The system of claim 11, further wherein the diagnostics service is further configured to:
determine multiple causal stack frames based on the change properties;
identify an author for each function included in the multiple causal stack frames based on the change properties for each stack frame included in the multiple causal stack frames; and
distribute a notification to the author for each function, the notification assigning a task of developing a patch that resolves the application crash to the author of each function.

16. The system of claim 11, wherein the diagnostics service is further configured to add the causal stack frame to a crash repository; and
review multiple files included in the application to determine if any other files include the function included in the causal stack frame.

17. The system of claim 11, wherein the diagnostics service is further configured to:
store the causal stack frame in a crash repository including multiple causal stack frames;
identify a vulnerability in a piece of code by comparing the piece of code to the multiple causal stack frames included in the crash repository; and
determine the piece of code includes a vulnerability based on detecting a function included in at least one of the multiple causal stack frames in the piece of code.

18. The system of claim 11, wherein the stack trace mapping service is further configured to add a path including a file name and a line number to each stack frame included in the stack trace.

19. The system of claim 11, wherein the stack frames included in the stack trace are arranged in a hierarchical order so that each function below a first line of the stack trace ultimately leads to a call of a function included in the first line of the stack trace.

20. The system of claim 11, wherein the stack trace mapping service is further configured to retrieve the code version history data from a version control system that manages multiple code repositories including a code repository that stores each file included in the application.

* * * * *